United States Patent [19]

Yamaguchi

[11] Patent Number: 5,155,731
[45] Date of Patent: Oct. 13, 1992

[54] ERROR LOGGING DATA STORING SYSTEM
[75] Inventor: Syoji Yamaguchi, Hino, Japan
[73] Assignee: Fujitsu Limited, Kawasaki, Japan
[21] Appl. No.: 522,302
[22] Filed: May 11, 1990
[30] Foreign Application Priority Data
  May 11, 1989 [JP] Japan .................. 1-117996
[51] Int. Cl.$^5$ ............................................ G06F 11/00
[52] U.S. Cl. ................................. 371/16.5; 371/29.1
[58] Field of Search ..................... 371/16.5, 18, 29.1; 364/267

[56] References Cited
U.S. PATENT DOCUMENTS

| | | | |
|---|---|---|---|
| 4,209,846 | 6/1980 | Seppa .................... | 364/900 |
| 4,593,391 | 6/1986 | Mizushima et al. ....... | 371/16.5 |
| 4,633,467 | 12/1986 | Abel et al. ............. | 371/16.5 |
| 4,985,894 | 1/1991 | Suga ..................... | 371/16.5 |

FOREIGN PATENT DOCUMENTS 61-282944 12/1986 Japan .
63-316243 12/1988 Japan .
  1-91252  4/1989 Japan .

Primary Examiner—Charles E. Atkinson
Attorney, Agent, or Firm—Staas & Halsey

[57] ABSTRACT

An error logging data storing system containing a first storing unit for storing error logging data corresponding to an error of high importance, a second storing unit for storing error logging data corresponding to an error of either high or low importance. A first indicating unit indicates whether or not the first storing unit is occupied by error logging data the diagnosing operation of which is not completed. A second indicating unit indicates whether or not the second storing unit is occupied by error logging data the diagnosing operation of which is not completed. A storage control unit stores error logging data corresponding to an error of high importance in the second storing unit when the first indicating unit indicates that the first storing unit is occupied by error logging data the diagnosing operation of which is not completed and the second indicating unit indicates that the second storing unit is not occupied by error logging data the diagnosing operation of which is not completed.

11 Claims, 3 Drawing Sheets

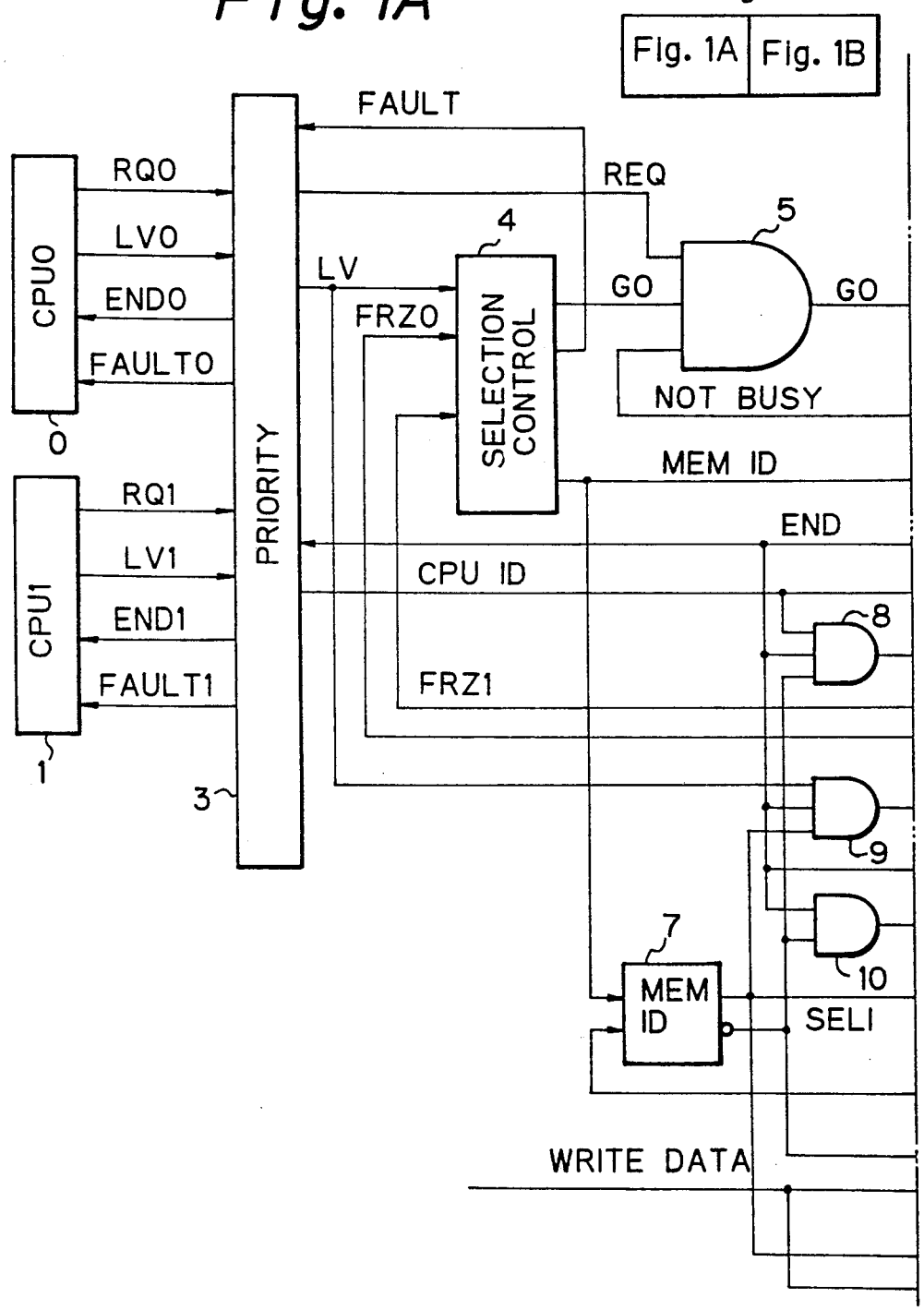

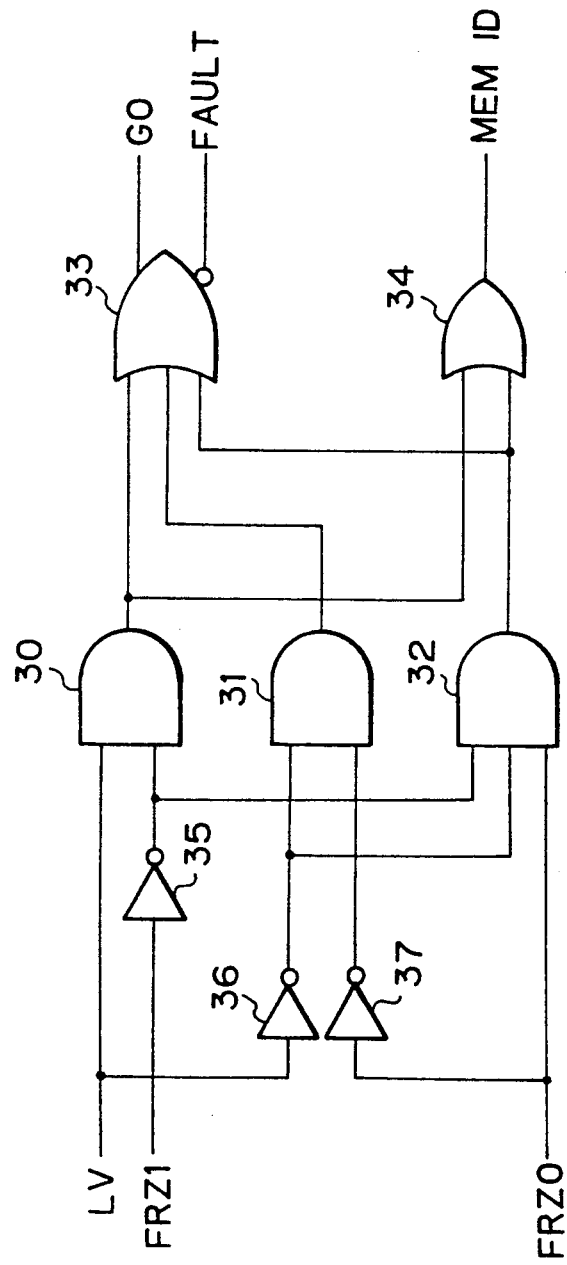

ERROR LOGGING DATA STORING SYSTEM

BACKGROUND OF THE INVENTION (1) Field of the Invention

The present invention relates to an error logging data storing system which is provided between a data processing system and a service processor which is provided for diagnosing errors occurring in the data processing system for maintenance support. When an error occurs in the data processing system, the data processing system stops by itself, and informs the error logging data storing system of the error for sending error logging data thereto. The error logging data is stored in the error logging data storing system until the diagnosing operation of the error logging data by the service processor is completed. The provision of the error logging data storing system between the data processing system and the service processor enables the data processing system to restart its operation before the completion of the diagnosing operation of the error logging data by the service processor.

(2) Description of the Related Art

In the conventional error logging data storing system, a plurality of memory areas are provided corresponding to degrees of importance of errors. Typically, two memory areas are provided and are exclusively used for storing error logging data corresponding to errors of high importance which bring the data processing system into a down state, and errors of low importance which do not bring the data processing system into a down state. The provision of the plurality of memory areas for respective degrees of importance of the errors, facilitates the diagnosing operation by the service processor.

However, in the conventional error logging data storing system, when the memory area for the errors of high importance is used, i.e., the diagnosing operation of the error logging data for the previous error of high importance is not completed Yet, it is impossible to store further error logging data for another error of high importance because the plurality of memory areas are fixedly assigned for respective degrees of importance of errors.

SUMMARY OF THE INVENTION

An object of the present invention is to provide an error logging data storing system wherein the capacity for error logging data corresponding to errors of high importance can be flexibly increased.

According to the present invention, there is provided an error logging data storing system, containing: a first storing unit for storing error logging data corresponding to an error of high importance; a second storing unit for storing error logging data corresponding to an error of either high or low importance; a first indicating unit for indicating whether or not the first storing unit is occupied by error logging data the diagnosing operation of which is not completed; a second indicating unit for indicating whether or not the second storing unit is occupied by error logging data the diagnosing operation of which is not completed; and a storage control unit for storing error logging data corresponding to an error of high importance in the second storing unit when the first indicating unit indicates that the first storing unit is occupied by error logging data the diagnosing operation of which is not completed, and the second indicating unit indicates that the second storing unit is not occupied by error logging data the diagnosing operation of which is not completed The above error logging data storing system according to the present invention, further can comprise a third indicating unit for indicating degree of importance of the error corresponding to error logging data which is stored in the second storing unit.

The above error logging data storing system according to the present invention, further can comprise an access control unit for transferring error logging data from a data processor to either of the first and second storing unit.

The above error logging data storing system according to the present invention, further can comprise a transfer completion informing unit for informing completion of a transfer operation of error logging data, to a data processor from which the error logging data has been transferred.

The above error logging data storing system according to the present invention, further can comprise an impossibility informing unit for informing impossibility of a transfer operation of error logging data, to a data processor from which a request for storing the error logging data has been sent.

The above error logging data storing system according to the present invention, further can comprise a priority control unit for receiving a request for storing error logging data, which is first sent thereto, among requests for storing error logging data, which are sent from a plurality of data processors, a first processor indicating unit for indicating from which of the plurality of data processors the error logging data is stored in the first storing unit, and a second processor indicating unit for indicating from which of the plurality of data processors the error logging data is stored in the second storing unit.

BRIEF DESCRIPTION OF THE DRAWINGS

In the drawings:

FIG. 1 shows the relationship between FIGS. 1A and 1B.

FIGS. 1A and 1B illustrate construction of the embodiment of the present invention; and FIG. 2 shows the construction of the selection control circuit 4 in the construction of FIG. 1.

DESCRIPTION OF THE PREFERRED EMBODIMENTS

Figure 1B:
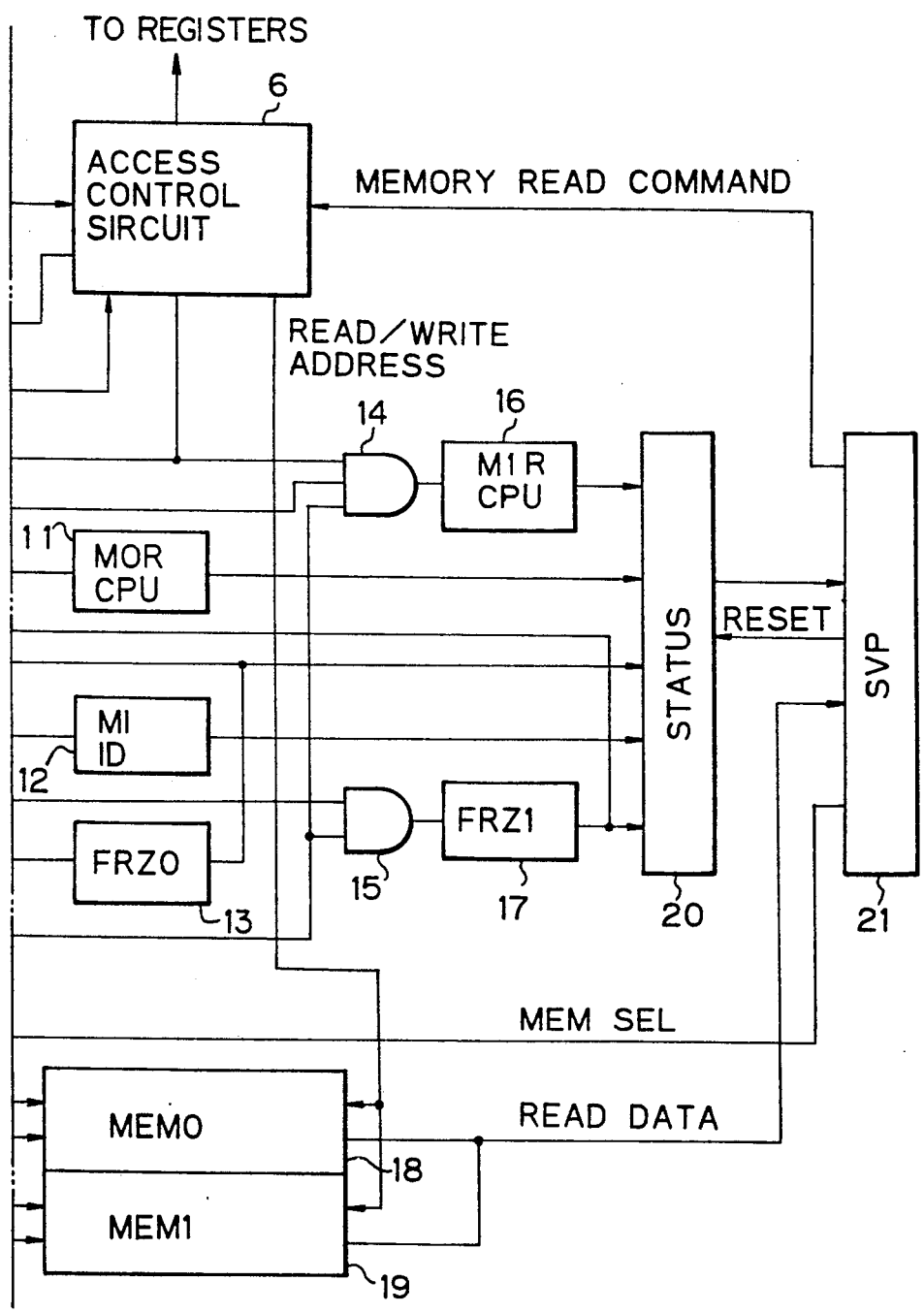

In FIGS. 1A and 1B, reference numerals 0 ad 1 respectively denote a central processing unit, 3 denotes a priority control circuit, 4 denotes a selection control circuit, 5, 8, 9, 10, 14 and 15 each denote an AND circuit, 6 denotes an access control circuit; 7 denotes an accessing memory indication register, 11 and 16 each denote first and second CPU indication registers, 12 denotes a memory occupying error level indication register, 13 and 17 each denote a first and second freezing status register, 18 and 19 each denote a memory unit, 20 denotes a status register, and 21 denotes a service processor.

The CPU's 0 and 1 are processors in a multiprocessor data processing system, and the errors which occur in the data processing system are diagnosed by the service processor 21. The components shown in FIGS. 1A and 1B except the CPU's 0 and 1, and the service processor 21 constitutes the error logging data storing system as an embodiment of the present invention. The CPU's 0 and 1 each has a function to detect an occurrence of an error in its own processor, stops its operation, and send a request for transferring error logging data regarding the error, together with the information on the degree of importance of the error, to the error logging data storing system. When the CPU receives a signal which indicates that the requested transfer operation is completed, or a signal which indicates that the requested transfer operation is impossible, from the error logging data storing system, the CPU restarts its operation.

In the construction of FIGS. 1A and 1B, the memory unit 18 is provided for storing error logging data corresponding to an error of high importance, and the memory unit 19 is provided for storing error logging data corresponding to an error of either high or low importance.

In FIGS. 1A and 1B, RQ0 denotes a request for transferring error logging data from the CPU 0, RQ1 denotes a request for transferring error logging data from the CPU 1, LV0 denotes information on the degree of importance of the error occurring in the CPU 0, LV1 denotes information on the degree of importance of the error occurring in the CPU 1, END0 denotes the signal to the CPU 0 indicating that the requested transfer operation is completed, END1 denotes the signal to the CPU 1 indicating that the requested transfer operation is completed, FAULT0 denotes the signal to the CPU 0 indicating that the requested transfer operation is impossible, and FAULT1 denotes the signal to the CPU 1 indicating that the requested transfer operation is impossible.

The above-mentioned request and the above-mentioned information on the degree of importance from each CPU, are applied to the priority control circuit 3 in the error logging data storing system. The priority control circuit 3 in the error logging data storing system, receives a first applied one of the above-mentioned requests RQ0 and RQ1 and the above-mentioned information LV0 or LV1 on the degree of importance accompanying the request. The request which is applied to the priority control circuit 3 next to the last received request can be received by the priority control circuit 3 after the transfer operation of the error logging data for the last received request is completed, or after the transfer operation of the error logging data for the last received request is determined to be impossible.

The priority control circuit 3 outputs a REQ signal which indicates that a request for transferring error logging data from a CPU is received, a LV signal which indicates the degree of importance of the error corresponding to the received request, and a CPU ID signal which indicates from which CPU the request is received. The LV signal is "0" when the degree of importance is high, or is "1" when the degree of importance is low. The CPU ID signal is "0" when the request is received from the CPU 0, or is "1" when the request is received from the CPU 1. Further, the priority control circuit 3 receives an END signal which indicates that the transfer operation of the error logging data for the received request to the error logging data storing system is completed, and a FAULT signal which indicates that the error logging data for the received request cannot be transferred to the error logging data storing system, in the error logging data storing system.

In the priority control circuit 3, when the request RQ0 from the CPU 0 is received, the CPU ID signal is set to "0", and the LV0 signal from the CPU 0 is selected as the LV signal output. Or when the request RQ0 from the CPU 1 is received, the CPU ID signal is set to "1", and the LV1 signal from the CPU 1 is selected as the LV signal output. In addition, when the request RQ0 from the CPU 0 is received, the END signal is output as the END0 signal, and the FAULT signal is output as the FAULT0 signal. Or when the request RQ0 from the CPU 1 is received, the END signal is output as the END1 signal, and the FAULT signal is output as the FAULT1 signal.

The selection control circuit 4 receives the above LV signal, and FRZ0 and FRZ1 signals respectively indicating whether or not the memory units 18 and 19 are occupied by error logging data the diagnosing operations of which are not completed yet. The selection control circuit 4 determines whether or not the error logging data for the received request can be stored in the error logging data storing system, and which memory unit the error logging data is to be stored, based on the above inputs. When it is determined that the error logging data for the received request can be stored in the error logging data storing system, the selection control circuit 4 outputs an active GO signal, or when it is determined that the error logging data for the received request cannot be stored in the error logging data storing system, the selection control circuit 4 outputs an active FAULT signal.

The construction of the selection control circuit 4 is shown in FIG. 2. In FIG. 2, reference numerals 30, 31, and 32 each denote an AND circuit, 33 and 34 each denote an OR circuit, and 35, 36, and 3 each denote an inverter. The LV signal and the inverted FRZ1 signal are applied to the AND circuit 30, the inverted LV signal and the inverted FRZ0 signal are applied to the AND circuit 31, and the inverted LV signal, the inverted FRZ1 signal, and the FRZ0 signal are applied to the AND circuit 32. The outputs of the AND circuits 30, 31, and 32 are applied to the OR circuit 33, and the outputs of the AND circuits 30 and 32 are applied to the OR circuit 34. The positive logic output of the OR circuit 33 is output as the GO signal, and the negative logic output of the OR circuit 33 is output as the FAULT signal. The output of the OR circuit 34 is output as a MEM ID signal which is "0" when it is determined that the error logging data is to be stored in the memory unit 18, or is "1" when it is determined that the error logging data is to be stored in the memory unit 19.

According to the construction of FIG. 2, when the LV signal is "1" and the FRZ1 signal is "0", the outputs of the AND circuits 30, 31, and 32 are respectively "1", "0", and "0", the GO signal becomes active, and the MEM ID signal becomes "1". This means that when a request for transfer of error logging data corresponding to an error of low importance is received, and the memory unit 19 is not occupied by error logging data the diagnosing operation of which is not completed, it is determined that the error logging data of the request is to be transferred to the memory unit 19 which is assigned to store error logging data corresponding to an error of either high or low importance. Or when the LV signal is "1" and the FRZ1 signal is "1", the outputs of the AND circuits 30, 31, and 32 are respectively "0", "0", and "0", the GO signal becomes inactive, and the FAULT signal becomes active. This means that when a request for transfer of error logging data corresponding to an error of low importance is received, and the memory unit 19 is occupied by error logging data the diagnosing operation of which is not completed, it is determined that the error logging data of the request cannot be transferred to the error logging data storing system.

When the LV signal is "1" and the FRZ0 signal is "0", the outputs of the AND circuits 30, 31, and 32 are respectively "0", "1", and "0", the GO signal becomes active, and the MEM ID signal becomes "0". This means that when a request for transfer of error logging data corresponding to an error of high importance is received, and the memory unit 18 is occupied by error logging data the diagnosing operation of which is not completed, it is determined that the error logging data of the request is to be transferred to the memory unit 18 which is assigned to store error logging data corresponding to an error of high importance. When the LV signal is "1" and both the FRZ0 and FRZ1 signals are "1", the outputs of the AND circuits 30, 31, and 32 are respectively "0", "0", and "0", the GO signal becomes inactive, and the FAULT signal becomes active. This means that when a request for transfer of error logging data corresponding to an error of high importance is received, and both the memory units 18 and 19 are occupied by error logging data the diagnosing operations of which are not completed, it is determined that the error logging data of the request cannot be transferred to the error logging data storing system. When the LV signal is "1" and the FRZ0 is "1" and FRZ1 signal is "0", the outputs of the AND circuits 30, 31, and 32 are respectively "0", "0", and "1", the GO signal becomes active, and the MEM ID signal becomes "1". This means that when a request for transfer of error logging data corresponding to an error of high importance is received, the memory units 18 is occupied by error logging data the diagnosing operation of which is not completed, and the memory units 19 is not occupied by error logging data the diagnosing operation of which is not completed, it is determined that the error logging data of the request is to be transferred to the memory unit 19 which is assigned to store 'error logging data corresponding to an error of either high or low importance.

The access control circuit 6 generates address signals of registers in turns in the CPU from which the request is received to output error logging data from the registers, when a GO signal is applied from the AND circuit 5. Although not shown, it is assumed that the CPU's contains a construction for decoding the above address, and outputting the content of the register which is addressed toward the error logging data storing system. It is further assumed that an error logging data transferring line is provided which is exclusively used for transferring error logging data from each register to the error logging data storing system. During the above output operation of the addresses of the registers in the CPU, the access control circuit 6 outputs a read address to the memory unit to which error logging data is determined to be stored, based on the above-mentioned MEM ID signal.

The MEM ID signal from the selection control circuit 4 is input into both the access control circuit 6 and the accessing memory indication register 7. The output of the accessing memory indication register 7 is applied to the memory units 18 and 19 as a chip select signal which makes one of the memory units 18 and 19 active in accordance with the MEM ID signal.

The access control circuit 6 further outputs a NOT BUSY signal which is inactive during the above address output operation for the transfer operation of error logging data between a CPU and the error logging data storing system. When a transfer operation of error logging data between a CPU and the error logging data storing system is completed, the END signal which is output from the access control circuit 6, becomes active.

The above NOT BUSY signal is applied to the AND circuit 5 together with the REQ signal from the priority control circuit 3 and the GO signal from the selection control circuit 4. When all of the inputs are active, the GO signal is applied to the access control circuit 6.

The END signal from the access control circuit 6 is applied to the priority control circuit 3, and the AND circuits 8, 9, 10, 14, and 15. The applications of the END signal to the AND circuits make respective registers corresponding to the AND circuits latch status when a transfer operation of error logging data is completed.

The AND circuit 8 further receives a negative output of the accessing memory indication register 7 which is "1" when the MEM ID signal is "0", and the CPU ID signal. The output of the AND circuit 8 is latched in the first CPU indication register 11. The AND circuit 14 further receives a positive output of the accessing memory indication register 7 which is "1" when the MEM ID signal is "1", and the CPU ID signal. The output of the AND circuit 14 is latched in the first CPU indication register 16. Namely, the number indicating the CPU from which error logging data is transferred to the memory unit 18, is latched in the first CPU indication register 11 after the transfer operation of error logging data to the memory unit 18 is completed, or is latched in the second CPU indication register 16 after the transfer operation of error logging data to the memory unit 19 is completed.

The AND circuit 9 further receives a positive output of the accessing memory indication register 7, and the LV signal. The output of the AND circuit 9 is latched in the memory occupying error level indication register 12. Namely, the LV signal is latched in the memory occupying error level indication register 12 after the transfer operation of error logging data to the memory unit 19, is completed, i.e., the output of the memory occupying error level indication register 12 indicates the degree of importance of the error corresponding to the error logging data which is stored in the memory unit 19.

The AND circuit 10 further receives a negative output of the accessing memory indication register 7 which is "1" when the MEM ID signal is "0", and the CPU ID signal. The output of the AND circuit 10 is latched in the first freezing status register 13. The AND circuit 15 further receives a positive output of the accessing memory indication register 7 which is "1" when the MEM ID signal is "1", and the CPU ID signal. The output of the AND circuit 15 is latched in the second freezing status register 17. Namely, "1" is latched in the first freezing status register 13 after the transfer operation of error logging data to the memory unit 18 is completed, and "1" is latched in the second freezing status register 17 after the transfer operation of error logging data to the memory unit 18 is completed.

The outputs of the first and second CPU indication registers 11 and 16, the memory occupying error level indication register 12, and the first and second freezing status registers 13 and 17, are latched in the status register 20. The statuses relating to the memory unit 18, are reset by service processor 21 when each diagnosing operation of the error logging data stored in the memory unit 18 is completed, and the statuses relating to the memory unit 19, are reset by service processor 21 when each diagnosing operation of the error logging data stored in the memory unit 19 is completed.

For carrying out the above diagnosing operation, the service processor 21 reads the error logging data stored in each memory units 18 or 19. At the beginning of the diagnosing operation, the service processor 21 sends a memory read command to the access control circuit 6, and a memory selection signal to the accessing memory indication register 7. Receiving the memory selection signal, one of the memory unit 18 or 19, which is instructed by the memory selection signal, is made active by the negative or positive output of the accessing memory indication register 7. At the same time, receiving the memory read command, the access control circuit 6 outputs addresses for reading the error logging data stored in he memory unit 18 or 19 which is instructed by the memory selection signal, to read the error logging data therein to the service processor 21.

As explained above, according to the present invention, error logging data corresponding to an error of high importance can be stored in the memory area which is conventionally provided for storing error logging data corresponding to an error of high importance, and thus the capacity for error logging data corresponding to errors of high importance can be flexibly increased.

I claim:

1. A system for storing error logging data, comprising:
   first storing means for storing error logging data corresponding to an error of high importance;
   second storing means for storing error logging data corresponding to an error of at least one of high and low importance;
   first indicating means for indicating whether said first storing means is occupied by error logging data;
   second indicating means for indicating whether said second storing means is occupied by error logging data; and
   storage control means for storing error logging data corresponding to an error of high importance in said second storing means when said first indicating means indicates that said first storing means is occupied by error logging data and said second indicating means indicates that said second storing means is not occupied by error logging data.

2. A system according to claim 1, further comprising third indicating means for indicating a degree of importance of the error corresponding to the error logging data stored in said second storing means.

3. A system for storing error logging data from at least one data processor according to claim 1, further comprising access control means for transferring error logging data from the data processor to either of said first and second storing means.

4. A system for storing error logging data from at least one data processor according to claim 1, further comprising transfer completion informing means for informing completion of a transfer operation of error logging data, to the data processor from which said error logging data has been transferred.

5. A system for storing error logging data from at least one data processor according to claim 1, further comprising an impossibility informing means for informing impossibility of a transfer operation of error logging data, to the data processor sending a request for storing the error logging data, based on at least an indication from said first indicating means and said second indicating means.

6. A system for storing error logging data from a plurality of data processors according to claim 1, further comprising:
   priority control means for receiving a request for storing error logging data sent, among requests for storing error logging data, from the plurality of data processors;
   first processor indicating means for indicating from which of the plurality of data processors error logging data stored in said first storing means was sent in response to said storage control means; and
   second processor indicating means for indicating from which of the plurality of data processors error logging data stored in said second storing means was sent in response to said storage control means.

7. A method of storing error logging data, comprising the steps of:
   (a) receiving an error logging request from a processor upon an error;
   (b) determining if the error has a first or a second priority;
   (c) determining whether a first memory is occupied when the error has a first priority;
   (d) storing in the first memory error logging data corresponding to the error logging request received in step (a) when the error has a first priority as determined in step (b) and the first memory is not occupied as determined in step (c);
   (e) storing in a second memory the error logging data corresponding to the error logging request received in step (a) when the error has a first priority as determined in step (b) and the first memory is occupied as determined in step (c); and
   (f) storing in the second memory the error logging data corresponding to the error logging request received in step (a) when the error has a second priority as determined in step (b).

8. A method according to claim 7, further comprising the step of (g) informing the processor sending the error logging request received in step (a) when the error logging data has been stored.

9. A method according to claim 7, further comprising the step of (g) storing data identifying the processor sending the error logging request received in step (a).

10. A method according to claim 7, further comprising the step of (g) informing the processor sending the error logging request received in step (a) when error logging is impossible.

11. A method according to claim 10, wherein error logging is impossible under at least one of the following conditions: when the error has the first priority as determined in step (b) and both the first memory and the second memory are occupied and when the error has the second priority as determined in step (b) and the second memory is occupied.

* * * * *

UNITED STATES PATENT AND TRADEMARK OFFICE
CERTIFICATE OF CORRECTION

PATENT NO. : 5,155,731
DATED : October 13, 1992
INVENTOR(S) : YAMAGUCHI

It is certified that error appears in the above-identified patent and that said Letters Patent is hereby corrected as shown below:

On the title page the second figure, and in the drawings sheet 2 of 3, Fig. 1B as indicated at numeral 6, change "Access Control Sircuit" to --Access Control Circuit--.

Col. 1, line 40, change "completed Yet, " to --completed, yet--.
Col. 4, line 30, change "3" to --37--.
Col. 7, line 18, change "he" to --the--.

Signed and Sealed this

Thirtieth Day of November, 1993

Attest:

BRUCE LEHMAN

Attesting Officer

Commissioner of Patents and Trademarks